Aug. 10, 1965   E. R. ROZSNYO   3,199,569
COMBUSTION CHAMBER FOR LIQUID FUEL
Filed Dec. 3, 1963
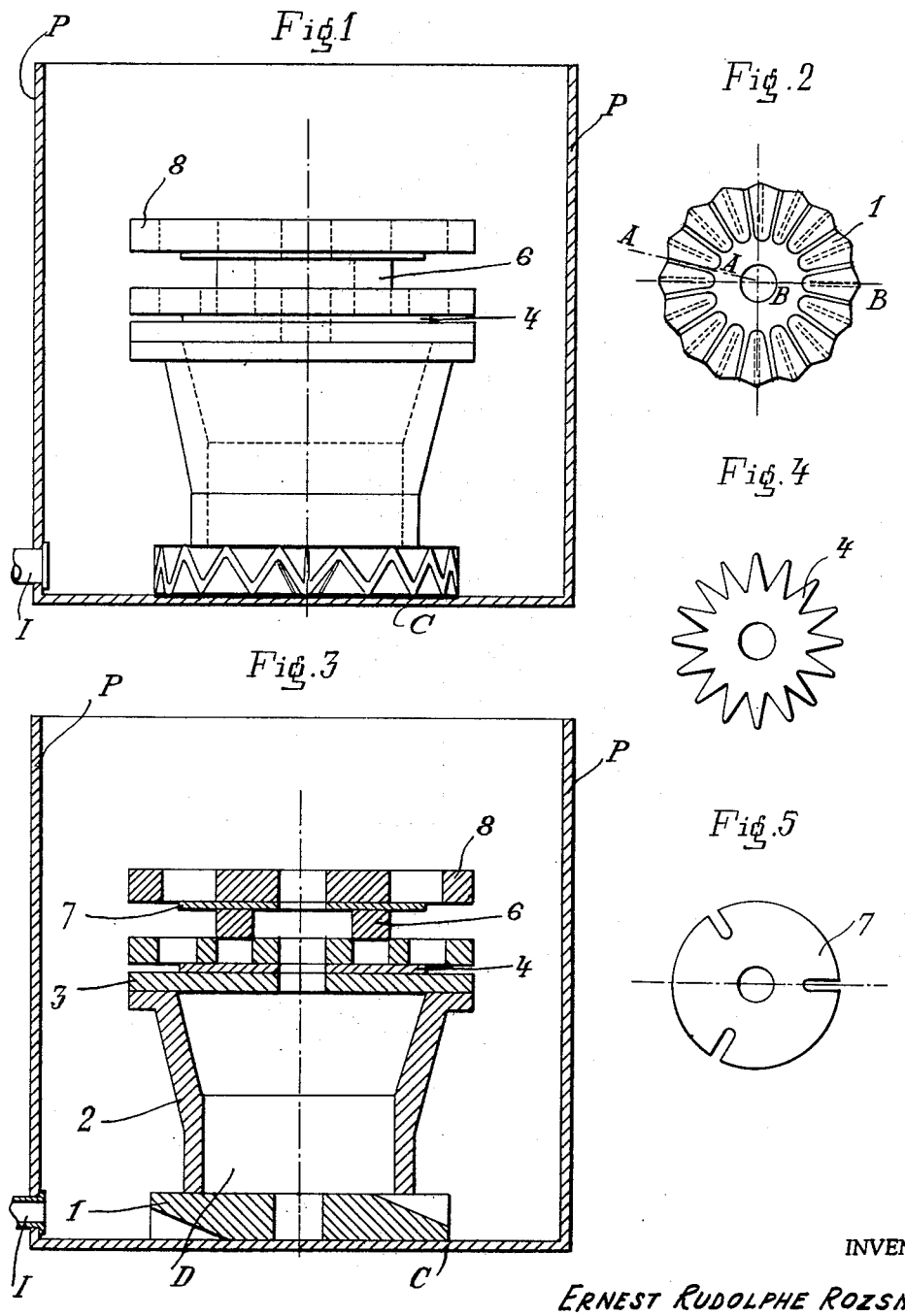
INVENTOR
ERNEST RUDOLPHE ROZSNYO
BY *Irwin S. Thompson*
ATTORNEY 3,199,569
COMBUSTION CHAMBER FOR LIQUID FUEL
Ernest Rudolphe Rozsnyo, 69 Blvd. Sainte-Agathe, Nice, Alpes-Maritimes, France
Filed Dec. 3, 1963, Ser. No. 327,774
Claims priority, application France, Dec. 10, 1962, 7,143
4 Claims. (Cl. 158—91)

The present invention relates to a means and an apparatus for the complete combustion of liquid fuel in heavy-liquid fired stoves and furnaces.

The present invention is a process for completing the combustion of the gases in heavy-oil stoves and furnaces having a heating plate, including fitting on the said plate at some spacing thereabove a chamber comprising a hollow body having thick walls and partially closed remote from said heating plate by a thick plate, combustion gases entering said chamber between same and said heating plate circulating in the chamber and issuing therefrom remote from said heating plate.

The present invention is also apparatus for gasifying and completing the combustion of heavy-liquid fuels already in a state of combustion in a firebox, the apparatus being particularly applicable to fuel-oil burning stoves or furnaces in which the liquid fuel is spread over a preheated plate on which it vaporises and ignites.

In such stoves and furnaces, it often happens that the fuel-oil is incompletely gasified and burnt producing fumes and soot with all the attendant disadvantages.

To obviate or mitigate these disadvantages, the invention consists in arranging a hollow body on the preheated plate, said hollow body having thick walls, preferably of a metal which is a good conductor of heat, and having openings at its top and bottom, to form a circulation chamber for the flames and hot gases in the midst of which it is situated. Being thus enclosed in the combustion space and withdrawn from contact with the cooled outside walls, this body is brought to a high temperature by the flames which surround and pass through it, and reacts in its turn by contact and by radiation on both the still liquid particles, which are not yet gasified and which may be carried over by the combustion gases, to vaporise these particles, and on the as yet unburnt gases to complete their combustion.

Such a hollow body may incorporate baffles for mixing the incompletely-burnt particles with the air mixed with the combustion gases. It is thus composed of substantially vertical tubular elements and perforated plates, in number and arrangement suitable for the furnace or combustion chamber to which the apparatus is to be applied.

An embodiment of the invention will now be described, by way of example, with reference to the accompanying drawing, which shows an arrangement for an apparatus in the construction of which several units may be associated or superposed in the combustion chamber depending on the dimensions thereof.

FIG. 1 shows in elevation an outside view, the installation of an apparatus according to the invention in a fuel-oil furnace shown diagrammatically in axial section;

FIG. 2 is a plan view of a corrugated base-plate of the apparatus;

FIG. 3 is an axial vertical section of the assembly of the apparatus and the furnace, the left-hand part of the base-plate (FIG. 2) being in half-section along the line A—A in FIG. 2, and the right-hand half being a half-section along the line B—B in FIG. 2; and FIGS. 4 and 5 are details of thin plates or sheets, separating thick plates forming baffles.

The combustion chamber of a fuel-oil furnace is shown in FIGS. 1 and 3 having side walls P, a heating plate C and a liquid-fuel inlet I. The gasifying apparatus consists of a base-plate 1 with corrugated partitions and a central perforation, which base-plate, when placed on the heating plate C of the furnace, enables the liquid and the combustion gases to enter a chamber D (see FIG. 3) formed of a hollow-body or conical tube 2 rising from the base-plate 1. This chamber D is bounded in its upper part by an assembly of perforated plates forming baffles to retard the rising hot gases and to ensure complete mixing of their different constituent parts, i.e., liquid particles, incompletely burnt gases and combustion air. For instance, the baffles consist of a plate 3 perforated both at its centre and elsewhere, and a plate 5 with a number of perforations including one in its centre separated from plate 3 by a relatively thin plate or sheet 4 (see FIG. 4) which plate or sheet is star-shaped to admit the passage of a part of the gases. It is further possible to fit above the plate 5 a tubular element 6 surmounted by a further perforated plate 8, which plate is separated from the element 6 by a thin laterally-notched plate 7 (see FIG. 5).

The tube 2 is conically flared towards the top, to correspond to the increase in volume of the gases as they become increasingly heated as they rise in the chamber D. Because of the progressive expansion of the gases the star-shaped plates 4 and 7 allow a small part of these gases to escape sideways.

Not only will the combustion be complete in the chamber D which is surrounded on all sides by incandescent partitions but these partitions equally act on the external masses of gas by conduction on the gas layers bathing them and by radiation on the remaining layers. Moreover these external gas masses will have no tendency to rise in view of the overheating within the chamber D which will form a chimney drawing the gases towards the inlets at the base of the apparatus.

The invention covers not only the combination of means in the assembled apparatus placed in the furnace, but also the apparatus intended for such purpose.

An advantage of this invention is that this apparatus enables the better functioning of fuel-oil fired stoves or furnaces, or others burning heavy oils, increasing their efficiency and preventing smoking and sooting, without in any way modifying the furnace or firebox itself.

I claim:

1. A combustion chamber having a bottom wall and upstanding side walls, a corrugated member resting on the bottom wall and spaced inwardly from the side walls, and an upright tubular member resting on the corrugated member with the corrugations extending radially so that said corrugated member provides passageways into the bottom of the tubular member, and means for introducing liquid fuel into the bottom of the combustion chamber outwardly of the corrugated member.

2. A combustion chamber as claimed in claim 1, the tubular member having cylindrical internal walls adjacent its lower end and upwardly outwardly flaring internal walls adjacent its upper end.

3. A combustion chamber as claimed in claim 1, and a plurality of flat perforated plates resting on each other and on the top of the tubular member.

4. In a combustion chamber, an upright tubular member, multiperforate means partially closing the top of the tubular member, the tubular member having cylindrical internal side walls adjacent its lower end and upwardly outwardly flaring internal walls adjacent its upper end, and a corrugated member resting on the bottom of the combustion chamber and on which the tubular member rests, the corrugations extending radially so that the corrugated member provides passageways into the bottom of the tubular member.

References Cited by the Examiner

UNITED STATES PATENTS

| 2,286,688 | 6/42 | Roth | 110—97 |
| 2,700,418 | 1/55 | Gilmore | 158—91 |

FOREIGN PATENTS

| 794,972 | 12/35 | France. |
| 946,185 | 12/48 | France. |
| 317,179 | 4/34 | Italy. |
| 303,163 | 1/55 | Switzerland. |

JAMES W. WESTHAVER, *Primary Examiner.*

FREDERICK KETTERER, *Examiner.*